Feb. 3, 1970  E. O. P. TATTER ET AL  3,493,232
RECORD CHANGER

Filed Dec. 9, 1966

Inventors:
Ernest O. P. Tatter
John Williigman
By Hofgren, Wegner,
Allen, Stellman & McCord
Att'ys

BEST AVAILABLE COPY

United States Patent Office 3,493,232
Patented Feb. 3, 1970

3,493,232
RECORD CHANGER
Ernest O. P. Tatter, Addison, and John Willigman, Elk Grove Village, Ill., assignors to Warwick Electronics Inc., a corporation of Delaware
Filed Dec. 9, 1966, Ser. No. 600,494
Int. Cl. G11b 17/10
U.S. Cl. 274—10                                   10 Claims

ABSTRACT OF THE DISCLOSURE

A record changer having a spindle for support of a record stack and means for ejecting a record from the stack with a record stabilizing arm supporting the edge of a record to provide balance for the record stack without the use of an overarm. The record stabilizing arm movable to different positions to support records of different diameters and a control part associated with the record stabilizing arm settable to control either a record repeat operation or a last record shut-off operation by coaction with a record size sense mechanism.

This invention relates to record changers and, more particularly, to a record changer of a construction which is more simply operated and has new and distinctive modes of operation.

One type of record changer which is available commercially has a record supporting spindle located centrally of the turntable and mechanism at one side of the turntable for supporting a stack of records of one size or another, but not permitting intermix of different size records in a stack. This type of record changer is, therefore, not the most common type. The most common type of record changer has a center spindle provided with a shelf for supporting a record or a stack of records and record ejector mechanism for ejecting the lowermost record of the stack from the shelf on the spindle for movement down to the turntable. With this type of record changer, it is quite difficult to load the initial record or first few records of a stack onto the spindle because of their tendency to tip, rather than lie horizontally and normal to the spindle. Once the record stack is assembled on the spindle, then it is conventional to have an overarm which can be swung over the stack of records to rest on the top thereof to maintain the record stack firmly in position during operation of the changer.

It is an object of this invention to provide a new and improved record changer which overcomes the difficulties in the common type of record changer in loading of a record onto the record changer spindle and which eliminates the conventional type of overarm for engagement with a stack of records supported on the spindle.

Another object of this invention is to provide a record changer having new and improved structure for playing records of different sizes automatically and having means for providing for repeat play or automatic shut-off of the changer after playing of the last record of a stack or a record placed manually on the changer turntable.

Another object of the invention is to provide a record changer for playing small hole records of differing diameters with provision for stabilizing support of the record stack on the spindle of the changer without use of any overarm and further with provision for obtaining automatic shut-off of the changer after playing of last record or, alternatively, repeat playing of the last record.

Another object of the invention is to provide a record changer as defined in the preceding paragraph in which the mechanism for stabilizing a stack of records has an alternative position for supporting and stabilizing records having large center holes when mounted on an adapter associated with the spindle wherein the adapter is of the type which locates the record off-set relative to the center line of the spindle.

A further object of the invention is to provide a record changer which can automatically repeat play records of at least two different diameters depending upon the setting of a control mechanism.

Still another object of the invention is to provide a record changer as defined in the preceding paragraphs wherein the record stabilizing member is located adjacent the periphery of the turntable and has two positions to support either a large diameter record or a smaller diameter record with a control part associated with the stabilizing mechanism having a first position to set the mechanism for automatic shut-off after playing of the last record and a second position providing for repeat operation of the last record and wherein said mechanisms are removably interconnected by flexible parts whereby the parts can be assembled and disassembled without removal of any fastening devices.

Further objects and advantages will become apparent from the following detailed description taken in connection with the accompanying drawings in which.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 1:
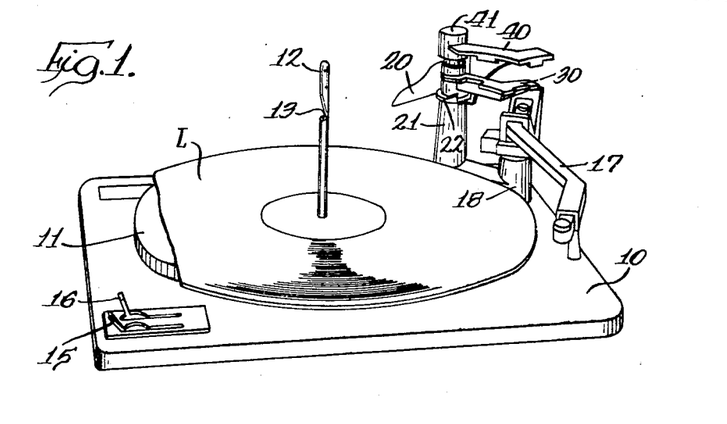
FIG. 1 is a perspective view of the record changer embodying the invention with a portion of a large diameter record on the turntable broken away to show the turntable.
Figures 5, 6, 7:
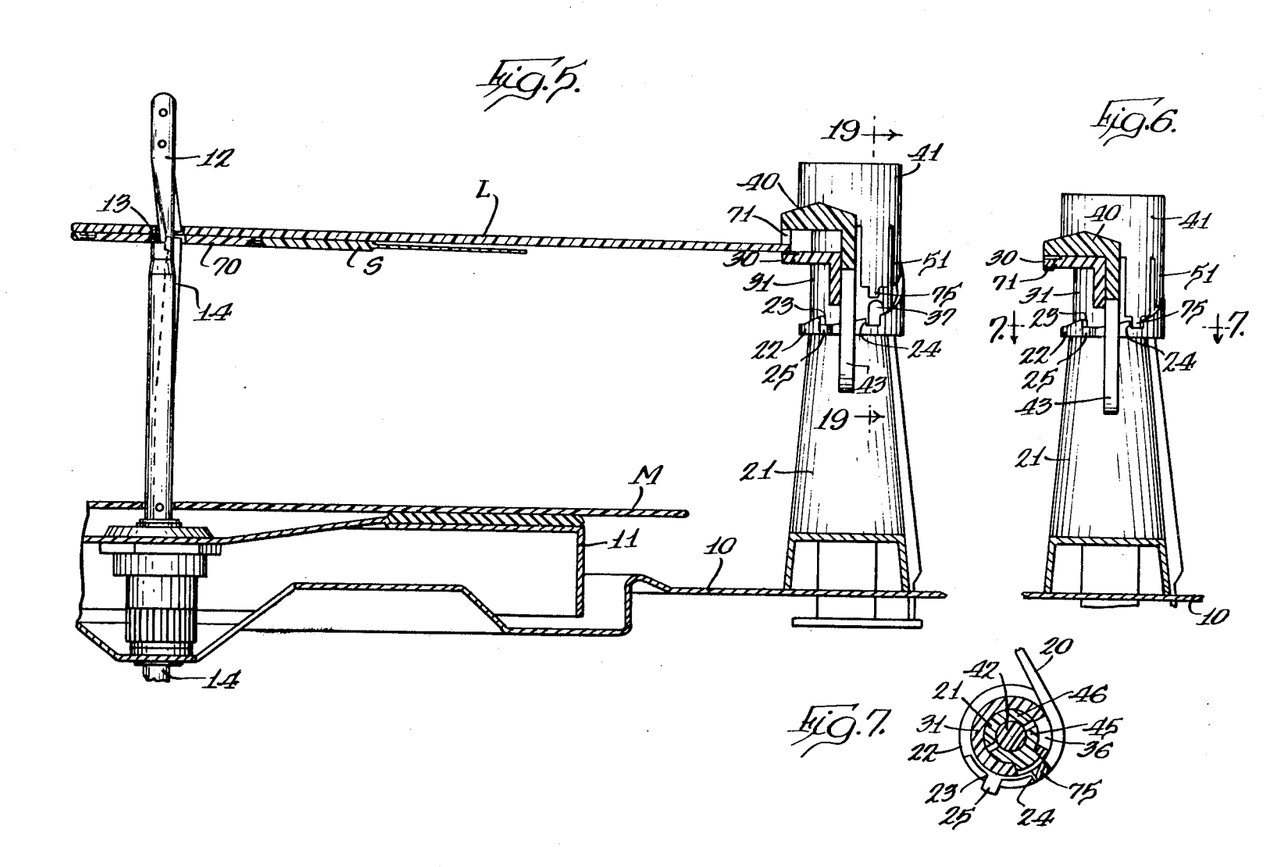
FIG. 5 is a vertical section of the mechanism, taken generally along the line 5—5 in FIG. 3, and with at least two records still remaining in the record stack.
FIG. 6 is a fragmentary view, similar to FIG. 5, but showing the control mechanism positioned after no more records remain in the record stack.
FIG. 7 is a section taken generally along the line 7—7 in FIG. 6.

The record changer is shown generally in FIG. 1 and embodies a number of generally conventional components, including a motorboard 10 on which a rotatable turntable 11 is mounted. A spindle 12 extends upwardly from the motorboard 10 centrally of the turntable for supporting a stack of records on a spindle shelf 13 (FIG. 5). The spindle is mounted to the motorboard 10 and does not rotate with the turntable and has a record ejecting mechanism in the form of a pivoted lever 14 extending beneath the motorboard for engagement by actuating mechanism to operate once in each cycle to shift the lowermost record of a record stack laterally off the spindle shelf 13, as well known in the art.

The record changer embodies a pair of conventional controls with a handle 15 being provided for controlling on-off and reject operations of the changer and a handle 16 providing for shift of a speed change mechanism for driving the turntable 11 at a speed appropriate to the type of record being played.

Another conventional part of the record changer is the tone arm 17 rotatable on a mounting base 18 for movement between a rest position, shown in FIG. 1, and positions overlying records for playing thereof. The tone arm structure is illustrated only generally and reference may be made to a commonly-owned application of the assignee of this application, Ser. No. 394,839, filed Sept. 8, 1964, now Patent No. 3,328,036, issued June 27, 1967, for a more detailed disclosure of the tone arm and its mounting.

The general operating mechanism for the record changer disposed beneath the motorboard has not been disclosed, since such structure is known and can be of the type disclosed in an application of Martin C. Reed et al. owned by the assignee of this application, Ser. No. 402,462, filed Oct. 8, 1964, now Patent No. 3,394,938, issued July 30, 1968, and the disclosure of said application is incorporated herein by reference. The Reed et al. application discloses a complete record changer with all of the operating mechanism, including the cyclically operable mechanism for obtaining ejection of a record from the spindle shelf 13, the controlled movement of the tone arm 17, and the operation of size sensing mechanism. For reasons more fully set forth hereinafter, the spindle 12 has been positioned rotatively 180° from the position shown in the aforesaid application in order to have the spindle shelf 13 facing in an opposite direction which requires a slight modification in the actuating mechanism of the Reed et al. application for the spindle ejector lever 14. Referring to said Reed et al. application, the drive gear 80 in operating through one revolution causes a lever 290, carried thereon, to engage a cam portion 286 of a lever 276 which pivots the latter lever and during the pivoting engages the lower end 78a of the ejector lever. Because of the rotative repositioning of the spindle in the instant application, it is necessary to actuate the ejector lever in the opposite direction and this is accomplished by revising the mechanism shown in FIGS. 2 and 8 of the Reed et al. application to have the push-off lever 290 engage the cam portion 286 at a location upwardly from the pivot 284 as viewed in said FIGS. 2 and 8, with the lever 260 having a downwardly-extending portion, as viewed in those figures, to engage the opposite side of the lever from that shown in said figures whereby, as the lever 276 is pivoted, the appropriate pivoting of the ejector lever of the spindle will result.

The record changer disclosed herein further includes size sense mechanism, including a flag 20 supported by a post 21 upstanding from the motorboard 10 which, as disclosed in the Reed et al. application is caused to move inwardly in each cycle of operation to a position where it can be engaged and moved outwardly by a large diameter record to resultingly sense such record and obtain proper positioning of the tone arm. If not engaged by a record descending from the spindle shelf 13, this gives an indication of a smaller diameter record and, accordingly, causes proper positioning of the tone arm 17 for playing the smaller record. The action of the flag 20 in coacting with mechanism disposed beneath the motorboard 10 for obtaining positioning of the tone arm as well as obtaining last record shut-off operation of the changer is the same as that disclosed in said Reed et al. application.

Figure 2:
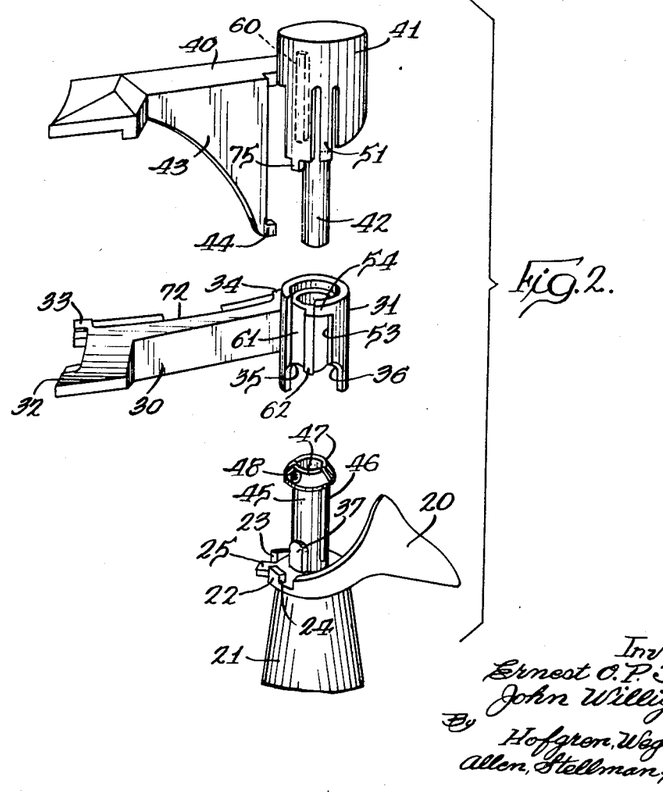
FIG. 2 is an exploded perspective view of the size sensing mechanism for a record and the record stabilizing and control mechanism for determining the operation of the changer.

The invention embodied herein resides in the mechanism shown in the exploded perspective view of FIG. 2 and comprises three major parts. The size sensing flag 20 has a ring 22 provided with a pair of circumferentially-spaced abutments 23 and 24 and an outwardly-extending lug 25, with this ring being rotatable on the post 21. A second part is the record stabilizing member in the form of an arm 30 having a collar 31 at an end thereof. This arm has a recessed upper surface providing a pair of limited contact areas 32 and 33 for engaging under an edge of a small diameter record, as subsequently described, and a limited surface 34 coacting with the surface 33 for engaging under the edge of a larger diameter record and, in either case, coacting with the shelf 13 of the spindle to provide three-point support for the records. The collar 31 has a pair of downwardly-facing notches 35 and 36 for holding the collar and stabilizing mechanism in either of two positions by having one or the other of the notches engageable with a lug 37 on the post 21.

The third part of the mechanism shown in FIG. 2 comprises a control part having an arm 40 with a sleeve 41 at the end thereof having a centrally depending pin 42 engageable within the post 21, with the sleeve 41 lying externally about the collar 31, when the parts are assembled. The control part arm 40 has a depending flange 43 with a stop member 44 at the lower end thereof.

Figures 19, 20, 21, 22, 23:
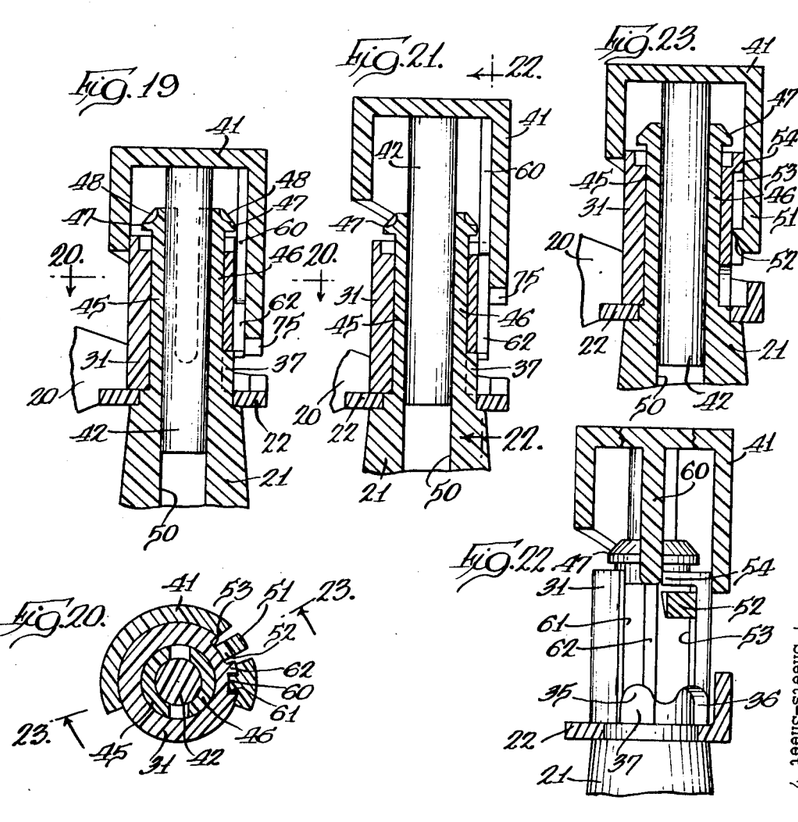
FIG. 19 is a vertical section, taken generally along the line 19—19 in FIG. 5.
FIG. 20 is a plan section, taken generally along the line 20—20 in FIG. 19.
FIG. 21 is a similar section to that shown in FIG. 19, but with the parts positioned for repeat play and taken generally along the line 21—21 in FIG. 8.
FIG. 22 is a vertical section, taken generally along the line 22—22 in FIG. 21.
FIG. 23 is a vertical section, taken generally along the line 23—23 in FIG. 20.

The assembly of the mechanism shown in exploded perspective in FIG. 2 is shown particularly in FIGS. 19–23. The mounting post 21 terminates in two upwardly-extending spaced parts 45 and 46 defining a generally cylindrical shape onto which the collar 31 fits, as shown in FIGS. 19, 21 and 23. The parts 45 and 46 are formed of a fairly rigid, but flexible, plastic material and have and outwardly extending flange 47 at each of their upper ends to lock over the top of the collar 31, but can be retracted by squeezing the parts 45 and 46 together to permit simple removal and assembly of the collar 31 relative to the post. In order to squeeze the parts 45 and 46 togther, a pair of recesses 48 are provided at the upper ends of the flanges 47 for reception of a tool such as the ends of the needle-nose pliers. The assembly of the collar 31 onto the post 21 results in having the notches 35 and 36 positioned for alternative selective engagement with the lug 37 on the post. The flanges 47 at the top of the post are spaced sufficiently from the top of the collar 31 to permit relative lengthwise movement of the collar on the post whereby the collar can be rotated and then lowered to have either of the notches 35 or 36 associated with the lug 37 on the post.

The sleeve 41 has the center pin 42 fitted into a central recess 50 in the post 21 for maintaining the sleeve in centered relation on the post and the sleeve fits down over the collar 31. The sleeve 41 is held in assembled relation with the collar by means of a flexible depending leg 51 which has a latch member 52 on the end thereof, as shown in FIG. 23, for movement along a recess 53 on the exterior surface of the collar 31 and for engagement at its upper limit of movement with a surface 54 on the collar 31 at the top of the recess 53. The sleeve 41 is manually engageable and liftable until the hook 52 engages the stop surface 54; further upward movement will result in lifting of the collar 31 whereby the collar can be rotated to put one of the notches 35 or 36 in engagement with the index lug 37 on the post 21 for positioning of the record stabilizer in the desired position. The sleeve 41 can be removed from the collar by outward flexing of the leg 51 to move the latch member 52 outwardly beyond the stop surface 54.

Figures 3, 4, 10:
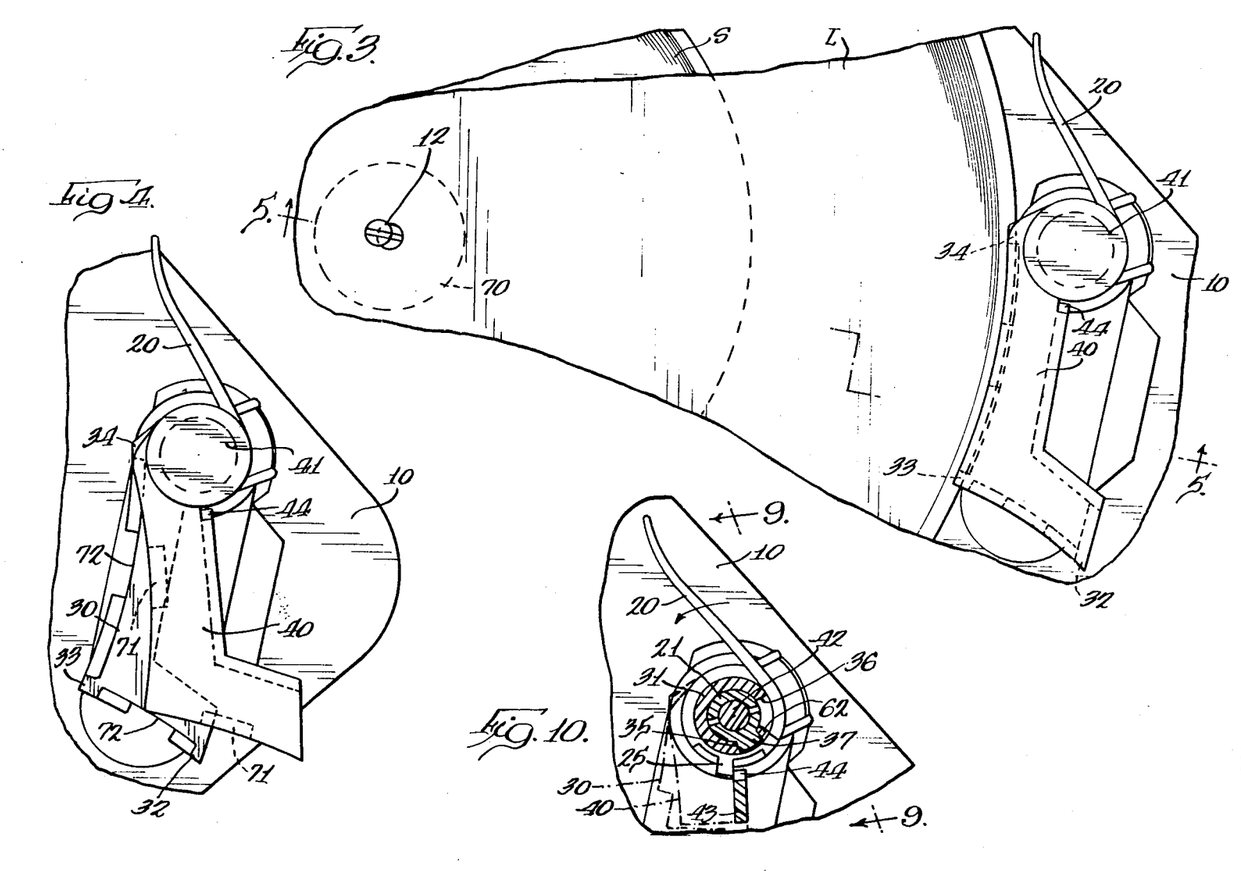
FIG. 3 is a fragmentary plan view of the record changer stabilizing a record stack having a large diameter record on the top and a smaller diameter record beneath which has a large central hole having a plug adapter and showing the control mechanism for the last record shut-off operation.
FIG. 4 is a view similar to FIG. 3, but showing the control mechanism set for repeat play of the last record but conditioned upon the fact that the record to be repeat-played must be of the large diameter because of the setting of the control mechanism.
FIG. 10 is a section taken generally along the line 10—10 in FIG. 9.
Figures 12, 13, 18:
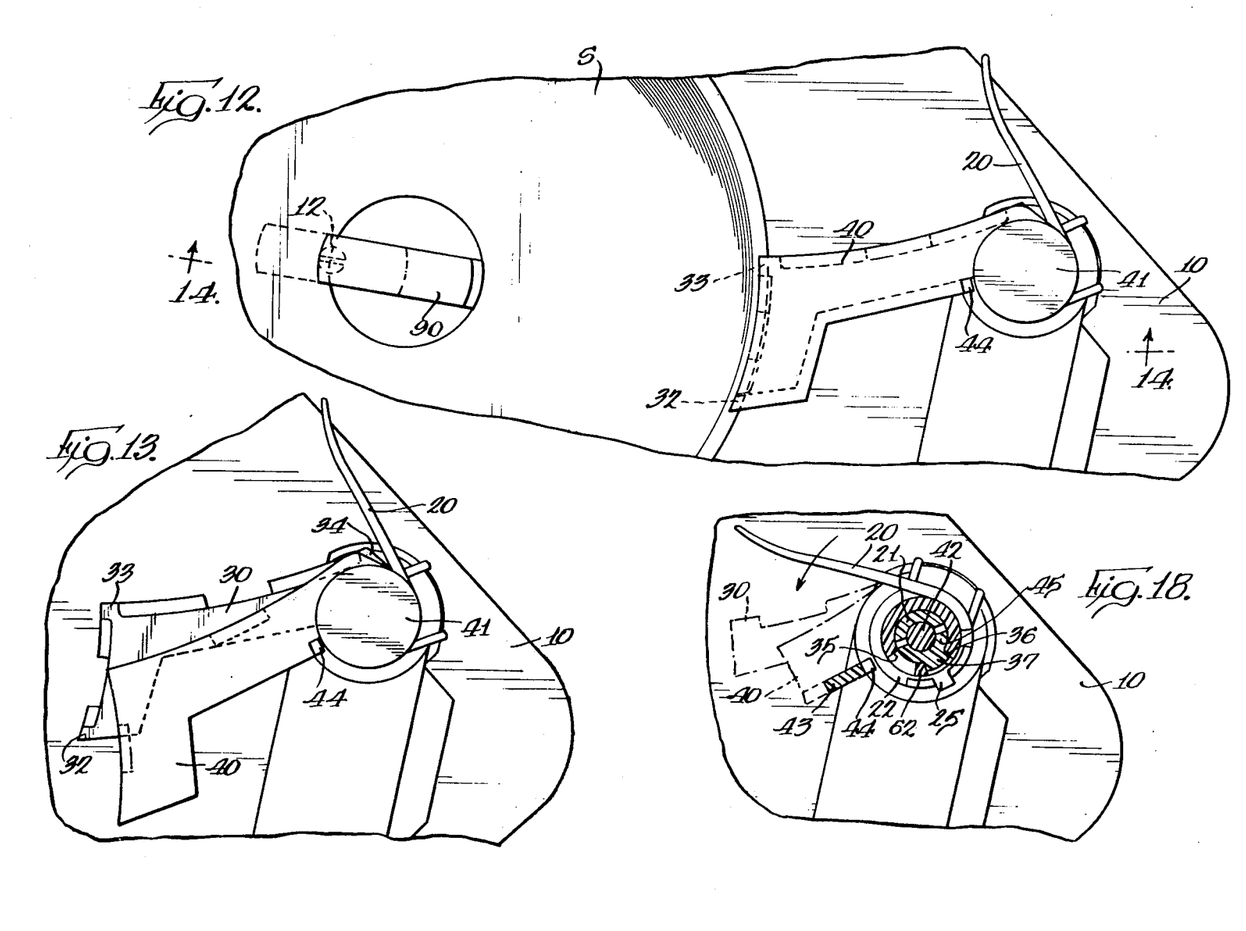
FIG. 12 is a fragmentary plan view, similar to FIG. 3, showing the record stabilizing and control mechanism positioned to operate with a small diameter record having a large center hole and supported on a spindle adapter.
FIG. 13 is a view similar to FIG. 12 showing the stabilizer still positioned for record support and the control part positioned for repeat play of a record.
FIG. 18 is a section, taken generally along the line 18—18 in FIG. 17.
Figures 14, 15, 16:
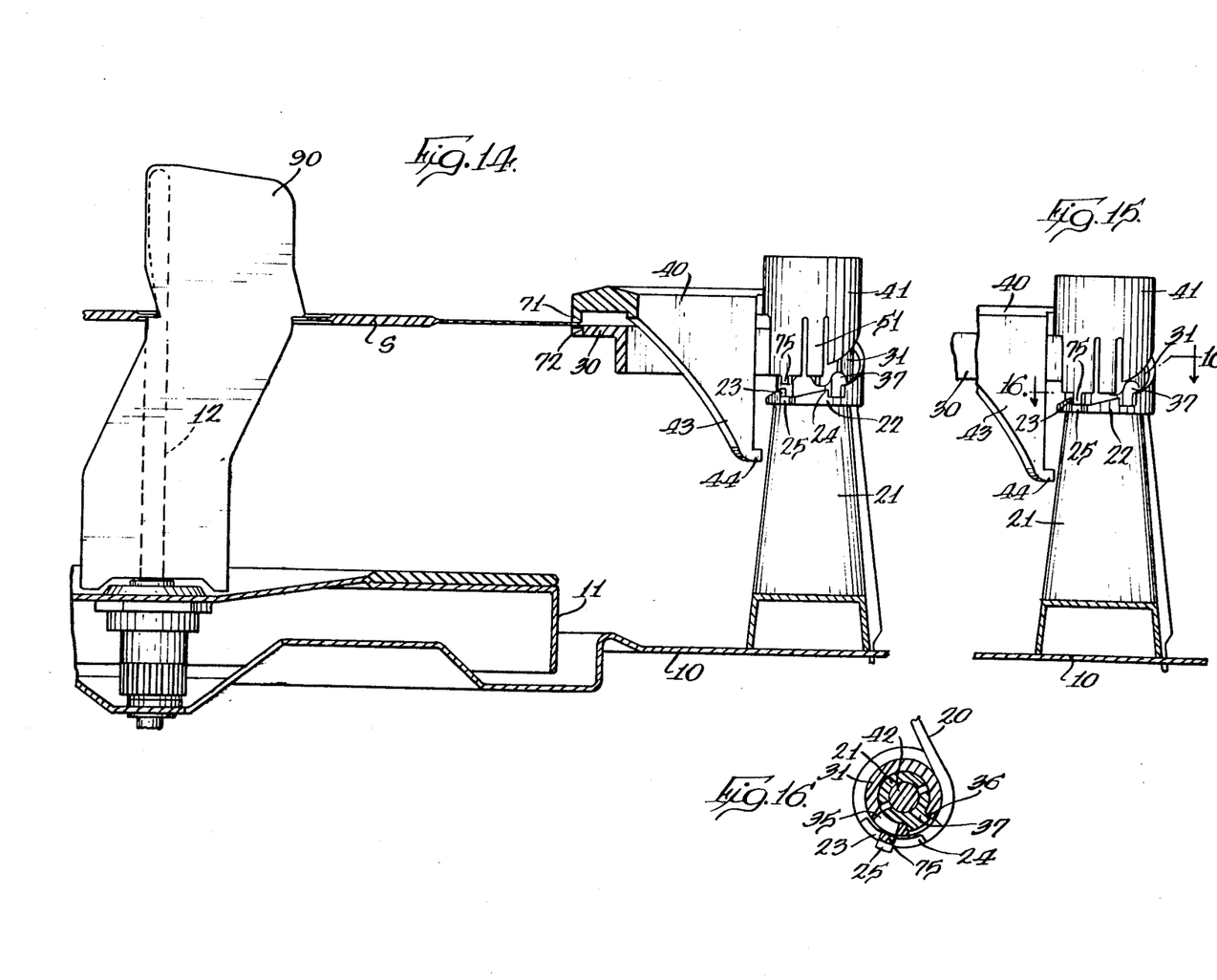
FIG. 14 is a vertical section, taken generally along the line 14—14 in FIG. 12.
FIG. 15 is a view of the record stabilizer and control mechanism similar to that shown in FIG. 14, but with the parts positioned for automatic shut-off operation of the changer.
FIG. 16 is a section taken generally along the line 16—16 in FIG. 15.

The sleeve 41 and collar 31 further coact in having a keying rib 60 on the inner surface of the sleeve 41 engageable in a keying slot 61 formed on the external surface of the collar 31, as shown in FIG. 19. This keyed relation causes rotation of the collar with the sleeve except when the sleeve 41 is raised to its uppermost position, as shown in FIG. 22, wherein the keying rib 60 lower end is at a height to rest upon the upper edge of a rib 62 between the recesses 53 and 61 on the exterior surface of the collar 31. This relation, shown in FIG. 22, establishes the repeat play position for a record and can be set with the stabilizer arm 30 either in the position shown in FIG. 12 or in FIG. 3. The actual position illustrated in FIG. 22 is shown in FIGS. 4 and 13. The rotation of the sleeve 41 relative to the collar 31 to place the rib 60 on top of the rib 62 is limited by the stop surface 54 at the upper end of the collar which also functions with the hook 52, as previously described.

With the foregoing description of the structure, reference may now be made to the series of figures showing the various operations that can be accomplished with the mechanism. FIGS. 3 and 5 show the parts positioned for playing a stack of records intermixed as to record diameter. For simplicity of reference, records will be referred to as 7" diameter, 10" diameter, and 12" diameter, with it being recognized that 7" diameter records come both with large center holes and with small center holes, while 10" and 12" records generally have small center holes. Reference to a smaller diameter record, as used throughout the specification and claims, can be considered as a 7" record, and reference to a larger diameter record, as referred to in the specification and claims, can be considered as a 12" record, although the mechanism disclosed and claimed can be modified to cover different optional sizes.

FIG. 5 shows a 10" record M on the turntable 11, with the stack including a 7" large center hole record S provided with a plug adapter 70 and a 12" record L at the top of the stack. The record stabilizer arm 30 is positioned to extend generally along the periphery of the largest diameter record, with the points 33 and 34 positioned beneath the record so as to support the record when it is on the spindle shelf 13. The control part arm 40 overlies the stack and has a downwardly depending lug 71 which aligns with a slot 72 in the stabilizer arm 30 and which moves into relation with the notch after the playing of the last record for automatic shut-off operation. This lug and notch relation provides for a sufficient length of movement of the sleeve 41 to set the parts for automatic shut-off operation. It will be seen in FIG. 5 that the 7" record S and 10" record M can both be supported solely by the spindle shelf 13, with the records being balanced by the fact that a larger diameter record L is on the top of the stack and extends over to the stabilizer mechanism for maintaining the stack balanced. In the next cycle of operation, the spindle ejector lever 14 will shift the 7" record S laterally away from the stabilizer, so that it moves off the shelf 13 and can descend onto the turntable. The previously referred to rotative repositioning of the spindle is for the purpose of having the ejected record move away from the record stabilizer so it can drop to the turntable.

The uppermost record L will then move onto the shelf 13 and be supported directly against the stabilizer arm 30 and, in the next cycle, the record L will move to the turntable and the control part 40 can move to the position shown in FIG. 6 to set the mechanism for automatic shut-off operation. This operation is accomplished by blocking the flag 20 against movement and is brought about by a stop member 75 (FIGS. 2 and 6) at the lower end of the sleeve 41 engaging against the abutment 24 on the flag ring 22. With the sleeve 41 keyed to the collar 31 and with the collar 31 having the notch 35 in engagement with the post lug 37, this locks the mechanism against rotation, resultingly locking the flag 20 against rotation. So long as there are records on the spindle shelf, as shown in FIG. 5, the stop member 75 is above the abutment 24 on the flag ring 22 whereby the flag 20 is free to move in, in each cycle, for detecting the size of record that is moving toward the turntable after shift off the spindle shelf 13.

Figure 8:
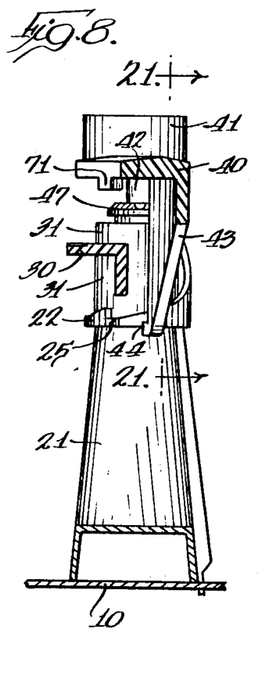
FIG. 8 is a view of the control mechanism, similar to that shown in FIG. 5 but with the parts positioned to obtain repeat play of a large diameter record, and corresponding to the positioning of the parts shown in FIG. 4.
Figures 9, 11:
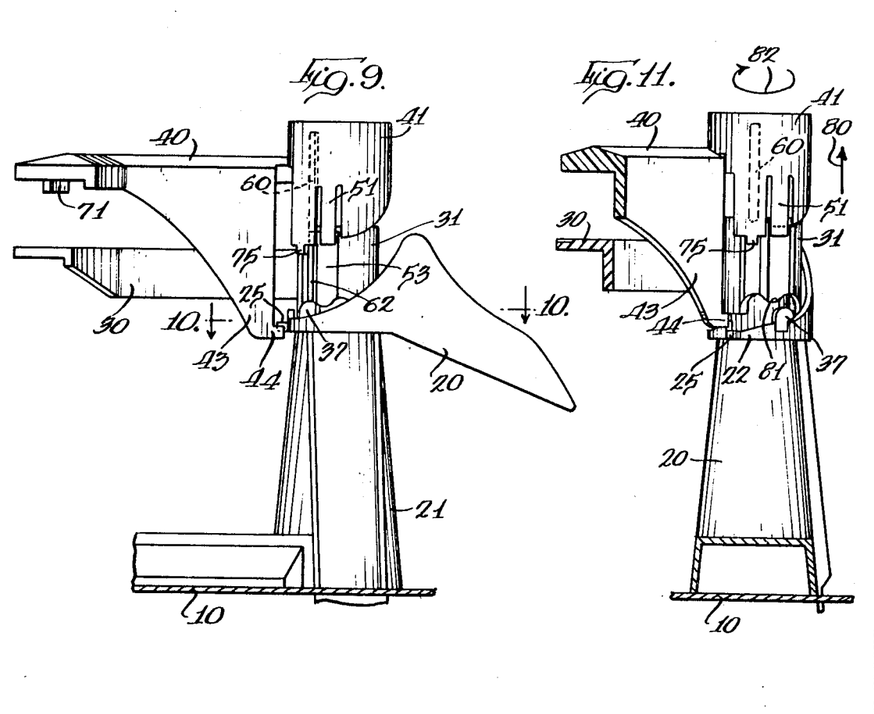
FIG. 9 is an elevational view, taken generally in the direction of the line 9—9 in FIG. 10, showing the control mechanism in cycle for obtaining repeat play of a large diameter record.
FIG. 11 is a view of the control mechanism shown in FIG. 5 and illustrating the relative movements of the control parts required to shift the control mechanism and stabilizing mechanism from operation with large diameter records to smaller diameter records.

The repeat play position for a large diameter record L is shown in FIGS. 4 and 8 wherein the control arm 40 is moved out of alignment with the stabilizer arm 30 and is held in an elevated position, as previously described in connection with FIG. 22, wherein the sleeve rib 60 rests on the rib 62 of the collar 31. In this position, the flange 43 and stop member 44 have been raised to a level to have the stop member 44 in alignment with the lug 25 on the flag ring 22. Thus, during an operating cycle in which the flag 20 is yieldably moved toward a position to sense the record size, the ring 22 will rotate until the ring lug 25 engages the stop member 44, as shown in FIGS. 9 and 10, which holds the flag 20 in the same position as if it had been moved by a large record L during movement of the record to the turntable. As a result, the size sense mechanism in the manner disclosed in the Reed et al. application will cause the tone arm to set down and play a 12" record L previously on the turntable.

The mechanism disclosed in the above referred to Reed et al. application, now Patent No. 3,394,938, is disclosed in a large number of figures in said patent and particular reference may be made to FIGS. 1, 2, 4, 6, 8 and 10. The description of this mechanism and the operation thereof is found in said specification and the following portions, although not being the only description, are referred to in order to direct particular attention to the description and operation: column 7, lines 57–75; column 8, lines 1–37; column 10, line 48 to column 12, line 12.

The various operations with the mechanism set for support of a large diameter record have been described and it should be noted that either record repeat or last record shutoff can be accomplished even if the record has been placed on the turntable manually.

Reference may now be made to small diameter record operation, with the mechanism being moved to the operating position in the manner indicated in FIG. 11. This operation embodies the manual lifting of the sleeve 41 in the direction of the arrow 80, with the latch member 52 (FIG. 23) engaging under the stop surface 54 to pick up the collar 31 and lift the notches 35 and 36 at the lower end thereof to a level to have the intervening part 81 above the locking lug 37 on the post 21. This upward movement of the collar 31 is permitted by the spacing of the flanges 47 on the post, as described previously. After this elevation, the mechanism is rotated in the direction indicated by the arrow 82 to move the parts to the position shown in FIG. 12. During this movement, the stop member 44 on the depending flange 43 is at an elevation above the lug 25 on the flflag ring 22 so as to not interfere therewith. After rotation, the parts are lowered and notch 36 engages lug 37.

For loading of records, the control part 40 is temporarily moved to the position shown in FIG. 13 to expose the surfaces 32 and 33 on the stabilizer arm 30 for engagement by a record. After loading, the control arm 40 can be moved to the position shown in FIG. 12, if there is to be automatic shut-off of the changer after playing the last record, or left where it is if the last record is to be repeatedly played.

In connection with the playing of small records, it should be noted that the length of stabilizer arm 30 is such as to permit playing of small diameter records with large holes which are supported by a spindle adapter 90 which can be of the type shown in Tatter Patent No. 3,191,942. This adapter fits on the spindle 12 to support a large hole record in position to be shifted by the ejector lever 14 and thus supports the record off-set with respect to the axis of the spindle 12. This results in offsetting the record as supported on the adapter relative to the position it will take on the turntable 11 and the length of stabilizer arm 30 and control arm 40 are selected accordingly. In the position shown in FIG. 12, a stack of records is supported on the stabilizer arm 30 and the control arm 40 is positioned to have automatic shut-off after the last record has been played in a manner similar to the operation set forth with respect to FIG. 6. When the last record has been played, the movement of the lug 71 into the notch 72 permits sufficient downward movement of the sleeve 41 to bring the stop member 75 downwardly into position to be engaged by the abutment 23 on the ring 22 to lock the flag 20 against movement with the result that the changer goes through a shut-off operation, similarly to that set forth in the Reed et al. application.

Figure 17:
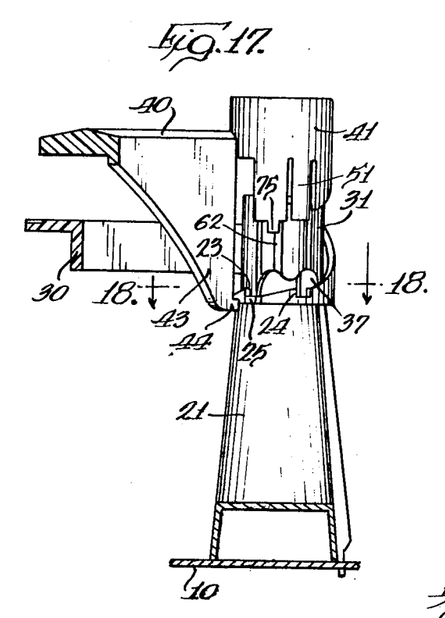
FIG. 17 is a partial view, similar to FIG. 14, of the mechanism positioned for repeat play of a small diameter record, such as shown in FIG. 13, but with the mechanism in cycle.

The position of the mechanism shown in FIG. 12 also permits manual playing of small hole 7" records without use of the adapter 90. In the event it is desired to obtain repeat playing of a small record, the control arm 40 can be moved to the position of FIGS. 13, 17 and 18, in which the parts are positioned, as previously described in connection with FIG. 22. When this operation is established, the parts are positioned with the depending flange 43 and stop member 44 located in a position disposed clockwise of the lug 25 on the flag ring 22, as viewed in FIG. 18. Therefore, these parts do not move into blocking relation and the flag 20 is free to move into a sensing position for a small hole record, as shown in FIG. 18. Even though there may be no record present, this still gives a signal that a small diameter record is to be played.

With the mechanism disclosed herein, records can be supported on a spindle or a spindle adapter, without requiring any overarm which must be moved into position over the record stack and solely requiring the positioning of a stabilizer member for engaging under the edge of the records. This facilitates loading and unloading of records. The mechanism includes the control part 40 having variable positions for determining operation of the changer, either to repeat play a record or to obtain automatic shut-off of the changer after playing the last record. The changer can play intermixed sizes of records so long as the large diameter record is on top to be supported by the record stabilizer and the control part 40 is set in alignment with the stabilizer arm 30 to obtain last record shutoff. Otherwise, the stop member 44 would be in position to engage the lug 25 on the flag ring and block the flag 20 from being operative to sense the size of record that is moving to the turntable. The changer can play small diameter records placed on the turntable manually with record repeat or automatic shut-off, or can play such records with large diameter holes and a spindle adapter automatically (with the options of record repeat or shutoff), and further can play them automatically when they have small holes, so long as a large diameter record L is placed on top of the record stack.

When the mechanism is set for large diameter records, the record sizes can be intermixed, with automatic shut-off after playing the last record, or, if the records are all of the large diameter, the control part 40 can be set for record repeat, so as to have the tone arm continue to set down at the large diameter record position. Also, in this position the changer can be used for manual single play of large records with either automatic shut-off or record repeat, dependent upon the position of the control part 40.

With the mechanism disclosed herein, the novel parts can easily be assembled without the use of separate fastening devices resulting from the flexible nature of the parts and their construction for interlocking, with this arrangement providing for simple repair or replacement of the parts as required.

We claim:
1. In a record changer for playing records of different diameters having a motorboard with a turntable rotatable thereon, a spindle extending upwardly from said turntable and having record support means and an ejector lever, a tone arm, and record size sense mechanism movable by certain size records to provide an indication of record size and usable to control the set down position of the tone arm, the improvement comprising, a record edge support member selectively positionable in either of two positions as required for the size of records supported on said spindle, and means movably mounted on said member and positionable to engage and hold said record size sense mechanism to activate a record repeat operation and control the record size indication given by the size sense mechanism.

2. A record changer as defined in claim 1 wherein said last mentioned means includes a manually positionable part which in one position coacts with the size sense mechanism in a record repeat operation and has another position which sets the record player in a last record shutoff operation by blocking said size sense mechanism from movement.

3. A record changer as defined in claim 1 wherein an adapter for large hole records supports a record stack eccentrically of the spindle and has a lower part concentric with the spindle, said member is a record stabilizing arm to engage under the edge of a record and coact with the spindle record support means in support of a record, said arm in one of said position being positioned to support a large diameter record and in a second position closer to the spindle being positioned to support a large hole record of smaller diameter fitted on said spindle adapter.

4. A record changer as defined in claim 3 wherein said means movably mounted on said member includes a selectively positionable part overlying said arm and having a first setting to move in a path toward and away from said arm and rest on said record stack and movable in a plane transverse to said first path of movement to a second setting, said part in the second setting coacting with the size sense mechanism in a record repeat operation and in the first setting coacting with the size sense mechanism to block movement of the latter when no record stack is present.

5. A record changer as defined in claim 4 wherein said size sense mechanism includes a flag which is positioned prior to lowering of a record from the stack and which is not engaged by a smaller diameter record but which is engaged and moved by a larger diameter record, and said part having an abutment which in the second setting of the part blocks positioning of the flag when the record stabilizing arm is positioned to support a large diameter record but which does not affect the flag when the record stabilizing arm is positioned to support a small diameter record.

6. In a record changer for playing records of different diameters, a motorboard, a turntable rotatably mounted on said motorboard, a spindle fixed to and extending upwardly from said motorboard centrally of the turntable and having a record supporting shelf at one side and record ejecting mechanism movably mounted thereon, a tone arm movably mounted on said motorboard, size sensing mechanism including a flag for detecting the size of a record, and a record stabilizer mounted on said motorboard at the side of said spindle opposite said shelf for supporting the edge of a record resting on the shelf and immovable during ejection of a record to permit shift of said record in a direction to move off said stabilizer by said record ejecting mechanism movable relative to said fixed spindle, and a control part keyed to said record stabilizer for movement with the latter between two positions where the latter alternatively edge supports records of two different diameters, said control part and stabilizer being mounted adjacent said flag, and the control part and flag having coacting detent means held out of engagement by records spacing the stabilizer and control part apart but engageable when no records are present on the stabilizer to lock said flag against movement preparatory to a last record shut-off operation.

7. A record changer as defined in claim 6 including means on the stabilizer to lock said control part in a raised position, and interengageable means on the control part and flag operable when the stabilizer is at the position to support larger diameter records and the control part is in raised position to position said flag at a position as if it had sensed a larger diameter record.

8. A record changer comprising, in combination, a turntable supported by a motorboard, a spindle extending upwardly centrally of said turntable and having a record supporting shelf, a tone arm, size sensing mechanism including a movable flag mounted on a post extending up from said motorboard at the side of the spindle opposite said shelf, a record stabilizer member mounted on said post for movement between two positions for alternatively supporting the edge of records of two different diameters, means on said member and post for releasably holding said member in one or the other of said positions, a control part keyed to said stabilizer member for movement therewith to either of said two positions, said part having first and second positions relative to the stabilizer member in each position of the latter, and means associated with the part and flag to lock said flag against movement when the part is in the first of said positions preparatory to last record shut-off operation regardless of the size record that has been supported, and means associated with the control part and flag to position the flag in a large record size sense position when the part is in the second of its positions and the stabilizer member is positioned to support large diameter records.

9. A record changer as defined in claim 8 wherein said record stabilizer member is in the form of a first arm with a collar rotatable on said post, said post having two flexible spaced legs with protuberances on the upper ends thereof whereby movement of the post legs toward each other permits release of said collar, and said control part includes a second arm with a sleeve fittable on said collar, and a flexible latch on said sleeve engageable in a groove on said collar for releasably holding the sleeve and collar together while permitting up and down movement of the sleeve relative to the collar and loosely keying the sleeve and collar for rotation together.

10. A record changer as defined in claim 9 wherein said flag has a ring rotatably surrounding said post beneath the sleeve, said means to lock the flag against movement including a pair of spaced-apart abutments on said ring and a detent extending down from said sleeve to engage one or the other of the abutments when no record is on the stabilizer member to hold the second arm spaced therefrom, and the means for positioning the flag in a large record size sense position includes means for releasably holding said control part elevated relative to said stabilizer member, and a member on said control part positioned to engage a lug on the flag ring during rotation of the flag into sensing position.

References Cited

UNITED STATES PATENTS

| 2,898,114 | 8/1959 | Vistain | 274—10 |
| 3,394,938 | 7/1968 | Reed et al. | 274—10 |
| 3,219,350 | 11/1965 | Geiger | 274—10 |
| 3,218,078 | 11/1965 | Freier | 274—10 |

LEONARD FORMAN, Primary Examiner

STEVEN L. STEPHAN, Assistant Examiner